(12) United States Patent
Typaldos (10) Patent No.: US 6,311,235 B1
(45) Date of Patent: Oct. 30, 2001

(54) UART SUPPORT FOR ADDRESS BIT ON SEVEN BIT FRAMES

(75) Inventor: Melanie D. Typaldos, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/184,277

(22) Filed: Oct. 31, 1998

(51) Int. Cl.[7] .................................................. G06F 13/00
(52) U.S. Cl. ................... 710/33; 710/4; 710/26; 710/30; 710/65
(58) Field of Search ............... 228/180.22; 710/1–4, 710/8–12, 22–30, 33–35, 58–64, 65; 702/114; 370/510, 359, 439; 340/505, 825.44, 825.52, 825.65; 358/1.12, 1.13, 1.14

(56) References Cited

U.S. PATENT DOCUMENTS

| | | | |
|---|---|---|---|
| 4,551,720 | * | 11/1985 | Levin ............................. 340/825.52 |
| 4,773,001 | * | 9/1988 | Blair et al. ..................... 340/825.52 |
| 5,173,683 | * | 12/1992 | Brighenti et al. ................ 340/505 |
| 5,192,947 | * | 3/1993 | Neustein ........................ 340/825.44 |
| 5,263,054 | * | 11/1993 | Davis et al. ....................... 375/340 |
| 5,375,120 | * | 12/1994 | Hirano et al. ..................... 370/358 |
| 5,428,813 | * | 6/1995 | Simmering et al. ................. 712/38 |
| 5,512,888 | * | 4/1996 | Hoshino et al. ............... 340/825.65 |
| 5,530,704 | * | 6/1996 | Gibbons et al. .................... 370/510 |
| 5,642,350 | * | 6/1997 | Dailey .............................. 370/439 |
| 5,805,909 | * | 9/1998 | Diewald ............................ 713/322 |
| 5,832,397 | * | 11/1998 | Yoshida et al. ...................... 701/29 |
| 5,896,549 | * | 4/1999 | Hansen et al. ...................... 710/22 |
| 5,958,024 | * | 9/1999 | Typaldos et al. .................... 710/26 |
| 5,978,865 | * | 11/1999 | Hansen et al. ...................... 710/22 |
| 6,028,675 | * | 2/2000 | Fields et al. ...................... 358/1.14 |
| 6,105,081 | * | 8/2000 | Typaldos ........................... 710/26 |
| 6,161,157 | * | 12/2000 | Tripathi et al. .................... 710/109 |
| 6,202,097 | * | 3/2001 | Foster et al. ...................... 709/238 |

OTHER PUBLICATIONS

"Am186™ ED/EDLV Microcontrollers User's Manual," Advanced Micro Devices, Inc. 1997, Chapters 1 and 10.
"Am186™ ES/ESLV and AM188™ ES/ESLV High Performance, 80C186–/80C188–Compatible and 80L 186–/80L 188–Compatible, 16–Bit Embedded Microcontrollers," Advance Micro Devices, Inc., Feb. 1997, pp. 1–2, 5–6, 9–10 and 51–52.
"Asynchronous serial multidrop systems using 9–data bit frames," Electronics Products Design, Jan. 1998, pp. C15–C18.

* cited by examiner

Primary Examiner—Christopher B. Shin
(74) Attorney, Agent, or Firm—Akin, Gump, Strauss, Hauer & Feld, LLP (57) ABSTRACT

An asynchronous serial port provides increased serial throughput. In data frames comprising eight data bits, at least one bit may be disabled. The status and communication bits within the frame are moved into the locations of the disabled bits. The number of bits in the transmission data frame is thus reduced by the number of disabled data bits.

25 Claims, 7 Drawing Sheets

UART SUPPORT FOR ADDRESS BIT ON SEVEN BIT FRAMES

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to microcontrollers, and more specifically, to a microcontroller having increased asynchronous serial port throughput.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may support a wide range of communication applications.

Microcontrollers have been used for many years in many applications. A number of these applications involve communications over electronic networks, such as telephone lines, computer networks, and local and wide area networks, in both digital and analog formats. In communications applications, a microcontroller generally has a number of integrated communications peripherals in addition to the execution unit. These can be low and high speed serial ports, as well as more sophisticated communications peripherals, such as a universal serial bus (USB) interface, and high level data link control (HDLC) channels.

An asynchronous serial communications port is one such common additional feature in a microcontroller. An asynchronous serial link allows the microcontroller to communicate with other devices or over data lines by sequentially sending and receiving bits of data. The "asynchronous" nature indicates these ports do not provide a separate clock signal to clock the data. Instead, the rate at which data is sent and received must be predetermined or prenegotiated, and independently controlled on both the sending and receiving ends. This data rate is known as the baud rate, which is the inverse of one bit period. The baud rate is generally one of a number of predefined rates, which are standard within the industry. Such rates include 1200, 2400, 4800, 9600, 19.2K, 28.8K, 33.3K, and 54K baud and high data transfer rates.

Due to the prevalence of serial data communication, many microcontrollers include one or more asynchronous serial ports (ASPs) which can transmit and receive data one bit at a time. Such microcontrollers typically employ interrupt signals to notify the microprocessor core that an ASP requires service. An ASP typically issues an interrupt request signal when a data unit has been received by the ASP and needs to be transferred from the ASP to an external memory unit, when the ASP is finished transmitting a data unit and the next data unit to be transmitted must be transferred from the external memory unit to the ASP, or when an error occurs.

An ASP can be configured for a variety data formats, although historically seven or eight data bits are typical values. A number of nine-bit serial protocols, however, have been developed using microcontrollers. These protocols are described in the Am186ES Users Manual and Am186ED Users Manual, both by Advanced Micro Devices, Inc. of Sunnyvale, Calif. As described in those applications, and as discussed below, a separate control bit is set or reset to act as the ninth data bit during transmission and reception of data. This ninth "data" bit is employed as an address bit, particularly useful in multi-drop protocols.

In protocols using an address bit, the address bit is transmitted as the last data bit. Because ASCII character set requires eight bits for full representation, most serial protocols use eight bits per frame. In these protocols, therefore, the address bit is the ninth data bit. In some applications, ASCII is not used on full representation is not needed and less than eight data bits are needed.

SUMMARY OF THE INVENTION

In a system according to the invention, a microcontroller provides an asynchronous serial port that supports address bits. Within each frame the address bit follows a series of data bits and precedes a high stop bit. According to the invention, however, the microcontroller can activate a signal to disable, not eliminate, at least one data bit. Specifically, the last data bit within a data frame is disabled if the bit is not part of the actual data being transferred, but instead, is merely a placeholder within the data frame. The address bit then replaces the data bit as the next bit in the sequence. In this way, the generation and detection of the address bit is not dependent upon the frame length in the serial port. Therefore, by disabling data bits not part of the actual data, an increase in serial throughput is realized.

DETAILED DESCRIPTION OF INVENTION

The following applications are hereby incorporated by reference:

U.S. patent application Ser. No. 09/088,610, entitled UART CHARACTER MATCHING USED FOR ADDRESS MATCHING ON A REGISTER-BY-REGISTER BASIS filed Jun. 1, 1998, by Melanie D. Typaldos;

U.S. patent application Ser. No. 08/807,103, entitled A MICROCONTROLLER WHICH IS CONFIGURABLE TO TRANSFER DATA TO AND FROM ONE OR MORE ASYNCHRONOUS SERIAL PORTS USING DIRECT MEMORY ACCESS, filed Feb. 4, 1997, by John P. Hansen and Melanie D. Typaldos; and U.S. patent application Ser. No. 08/775,262 entitled A MICROCONTROLLER HAVING HARDWARE FEATURES SUPPORTING 9-BIT SERIAL PROTOCOLS DURING DMA DATA TRANSFERS TO AND FROM ONE OR MORE ASYNCHRONOUS SERIAL PORTS, filed Feb. 4, 1997, by John P. Hansen, Ronald W. Stents, and Melanie D. Typaldos.

Figure 1A:
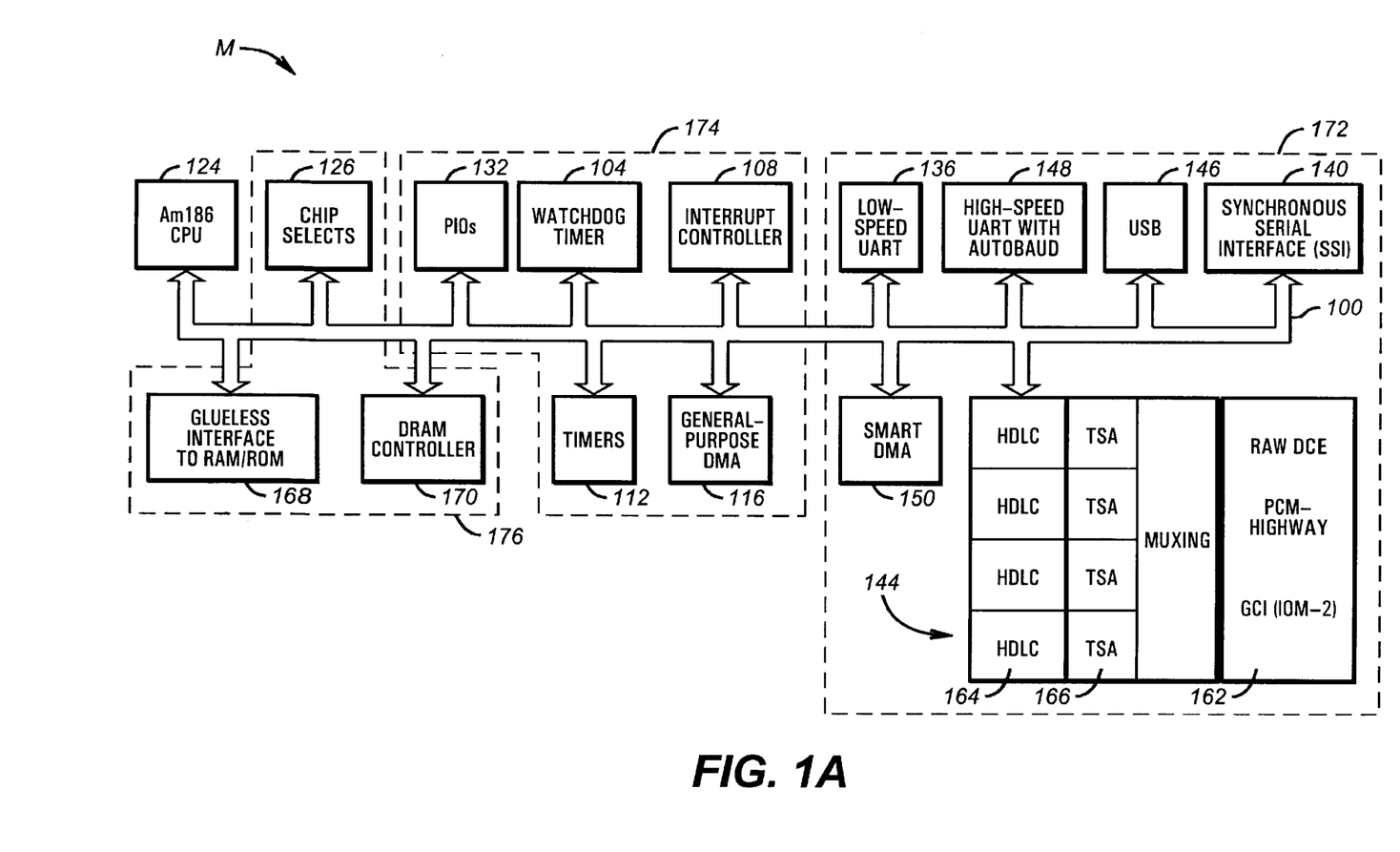
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176, and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three-channel timer control unit 112. The timer control unit 112 includes three 16-bit programmable timers. Another system peripheral is a general-purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 1B:
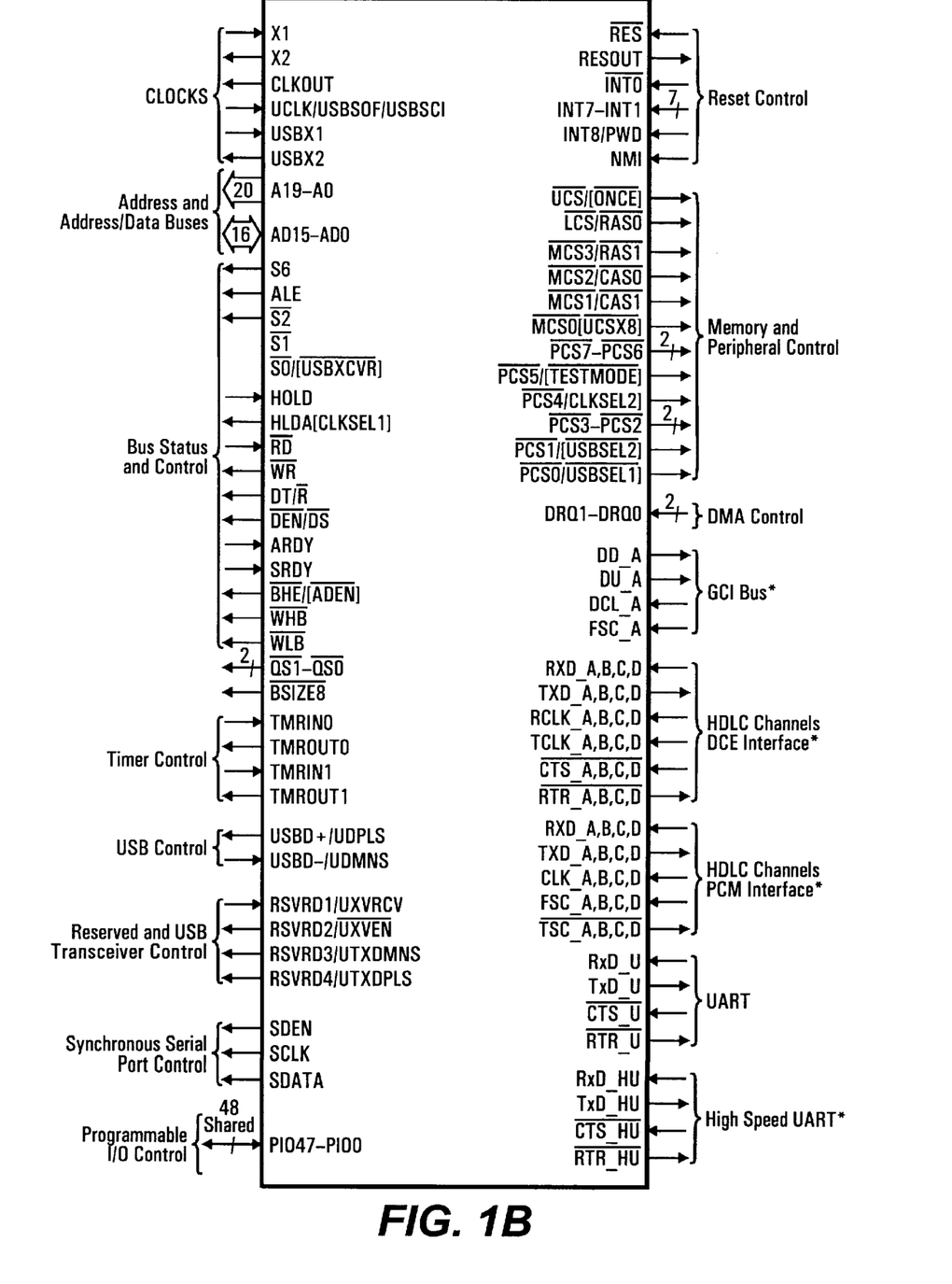
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general-purpose peripherals from FIG. 1A could be eliminated, or added to, without detracting from the spirit of the invention.

The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general-purpose controller functions. As here used, the term "microcontroller" covers all of the products, and generally means an execution unit with added functionality all implemented on a single monolithic integrated circuit.

Figure 2A:
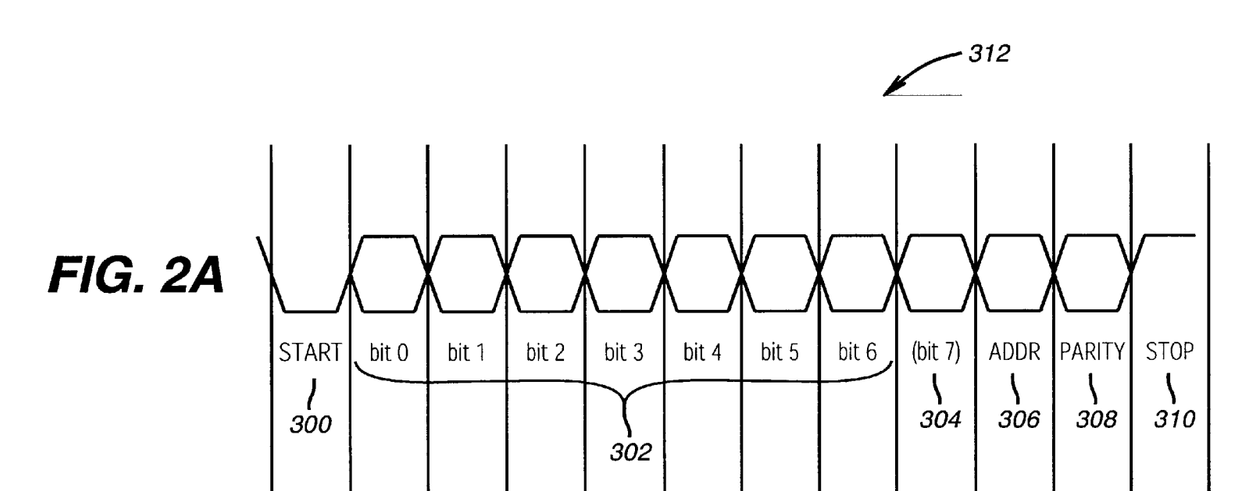
FIG. 2A is a timing diagram illustrating the use of address bits within an asynchronous serial frame having eight data bits.
Figure 2B:
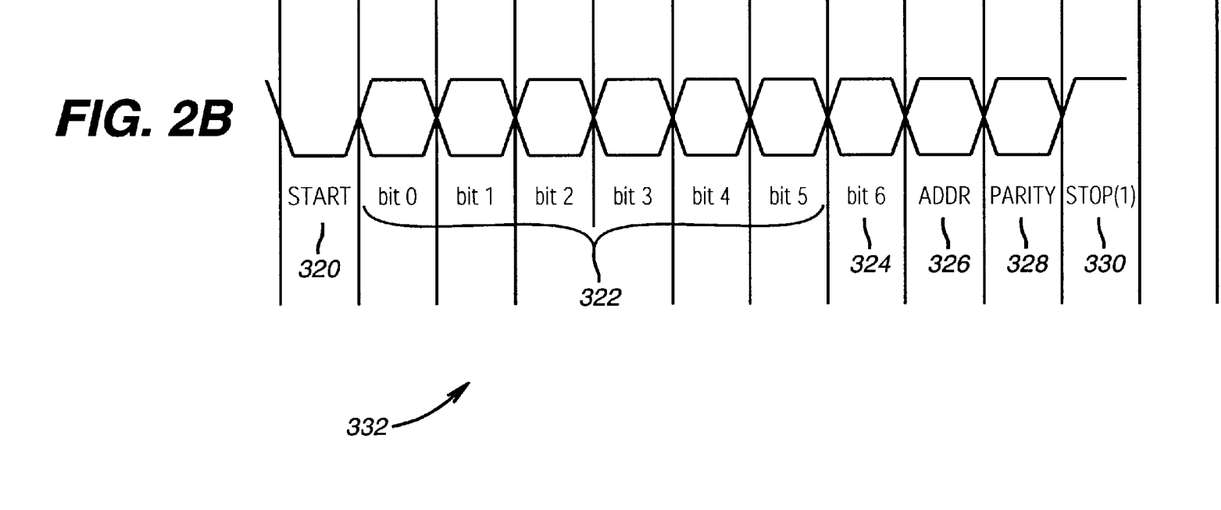
FIG. 2B is a timing diagram illustrating the use of address bits within an asynchronous serial frame having seven data bits.

Referring to FIGS. 2A and 2B, shown are asynchronous serial transmissions illustrating the bit disabling protocol according to the invention. FIG. 2A illustrates a transmission frame 312 wherein the disabling feature is not activated. After a start bit 300, an asynchronous serial port (ASP), such as the UART 136 or HSUART 148, transmits data bits numbered zero through six 302, and a last bit 304. These are standard data bits sent in an asynchronous protocol, low order bit first. With the disabling function not activated, bit seven 304 can either be an actual data bit or merely a placeholder in the frame sequence. After the last data bit 304, the address bit protocol supported by the ASP provides an address bit 306. After the address bit 306, an optional parity bit 308 is then followed by a stop bit 310. Although frames in present day applications typically have either a total of eight or seven data bits, embodiments of the present invention may consist of any number of bits, represented by n and n−1 data bits.

Turning to FIG. 2B, illustrated is a transmission frame 332 where an unused bit has been disabled. After a start bit 320, the ASP transmits data bits zero through five 322 and a last data bit 324. However with one bit disabled, the sixth bit 324 holds the last data bit position. An address bit 326 is then followed by an optional parity bit 328 and then a stop bit 330. Therefore, by disabling one of the data bits, the status bits including address, parity and stop are moved downward along the transmission frame 332. In this way, the total number of bits comprising the frame is reduced, increasing the overall serial throughput of the ASP.

The address bit protocol supported by the ASP according to the invention provides for an address bit 306 and 326. This address bit is typically used in applications such as multi-drop applications that require one master device to control multiple slave devices. Although called an address bit, this bit can act as an extended bit that effectively causes interrupts within the slave devices for flow and other control. This address bit protocol is known in the art.

Figure 3:
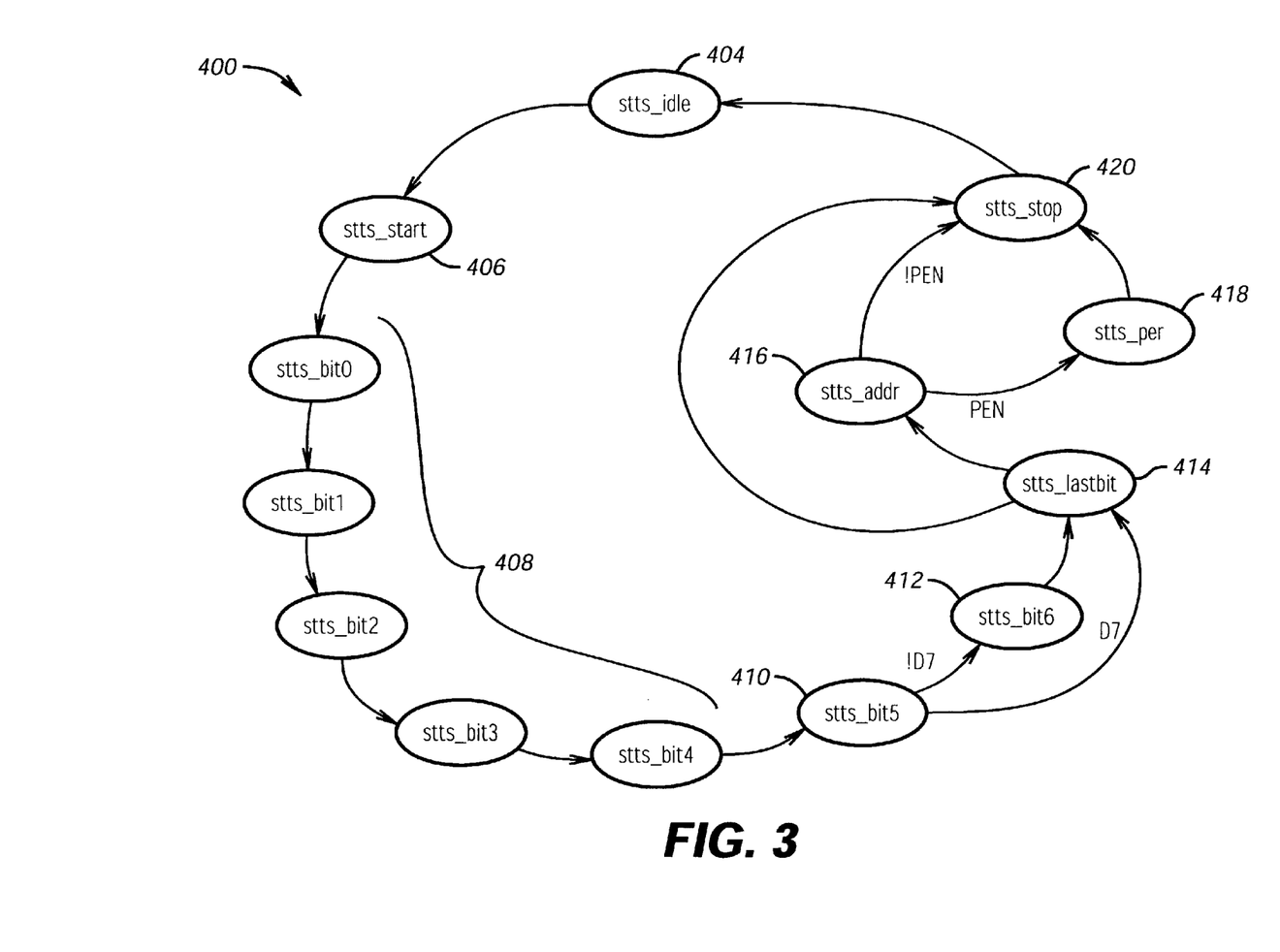
FIG. 3 is a transmit state machine for disabling a data bit.

The operation of a TX_SHIFT_SM state machine 400 is illustrated in FIG. 3. The TX_SHIFT_SM state machine 400 is the transmit shift state machine which sets the sequence of bits for the transmission frames 312 and 332. It is typically implemented in the circuitry of the ASP, where the ASP is the UART 136 or the HSUART 148. In addition, the TX_SHIFT_SM state machine 400 allows transmission to skip a data bit, thereby reducing the total number of data bits transferred. For purposes of this description "state" refers to the current state of the TX_SHIFT_SM state machine 400 and an "!" before a signal indicates logical negation, such that the expression is active when the signal is low. The TX_SHIFT_SM state machine 400 is clocked by a transmit clock. Control begins at a state stts_idle 404. This state indicates that there is no data currently in the shifter. On the first transmission of the transmit clock after data is written to the shift register, control proceeds to state stts_start 406. The state stts_start 406 indicates transmission of a start bit. On subsequent transmit clock transitions, control proceeds from state stts_bit0 through state stts_bit4 408. At each state, that specified bit is transmitted. For example, at state stts_bit0, the zero bit is transmitted. This is repeated for each selected bit in the transmission frame. Therefore, after state stts_start 406 and states stts_bit0 through stts_bit4 408, the transmitted bit sequence resembles the transmission frames 312, 332 up to and including bit four, as shown in FIGS. 2A and 2B. After state stts_bit4, control proceeds to stts_bit5 410. After the fifth bit is transmitted, control proceeds to state stts_bit6 412 when a signal D7 is deasserted. After the sixth bit has been transmitted, on the next transmit clock transition, control proceeds to state stts_lastbit 414. At this point, in an eight bit data frame, a start bit and bit zero through bit seven have been transmitted by the TX_SHIFT_SM state machine 400. In this mode no data bits have been disabled. Bit seven, therefore, is included in the data frame regardless of whether it has a true value.

Alternatively, after state stts_bit5 410, control proceeds directly to state stts_lastbit 414 when signal D7 is asserted. Thus, upon assertion of the D7 signal, the TX_SHIFT_SM state machine 400 transmits one fewer bit, as in frame 332 of FIG. 2B. After transmission of the last data bit (either the seventh or the eighth data bit), control proceeds to state stts_addr 416 upon the next transmit clock transition. Control then proceeds to state stts_per 418 when a parity enable signal PEN is asserted. After the parity bit has been transmitted, control proceeds to state stts_stop 420 on the next transmit clock transition. Alternatively, when PEN is deasserted, control proceeds directly from state stts_addr 416 to state stts_stop 420. Note however, that the address bit need not necessarily follow directly the last data bit. For example, the parity bit may be placed in front of the address bit 604 without departing from the present invention. Finally, control returns to state stts_idle 404 after a stop bit has been transmitted.

Therefore, seven-data bit frame values can be generated in an eight-data bit protocol by removal of one data bit. Removing an unneeded bit in this manner allows the definition of the frame types to remain essentially constant across the seven-data bit and the eight-data bit protocols. The placement of the address bit is not dependent on a specific frame protocol, i.e. seven bit or eight bit. Instead, the address bit is placed at a location immediately following the last data bit regardless of the frame length.

Figure 4:
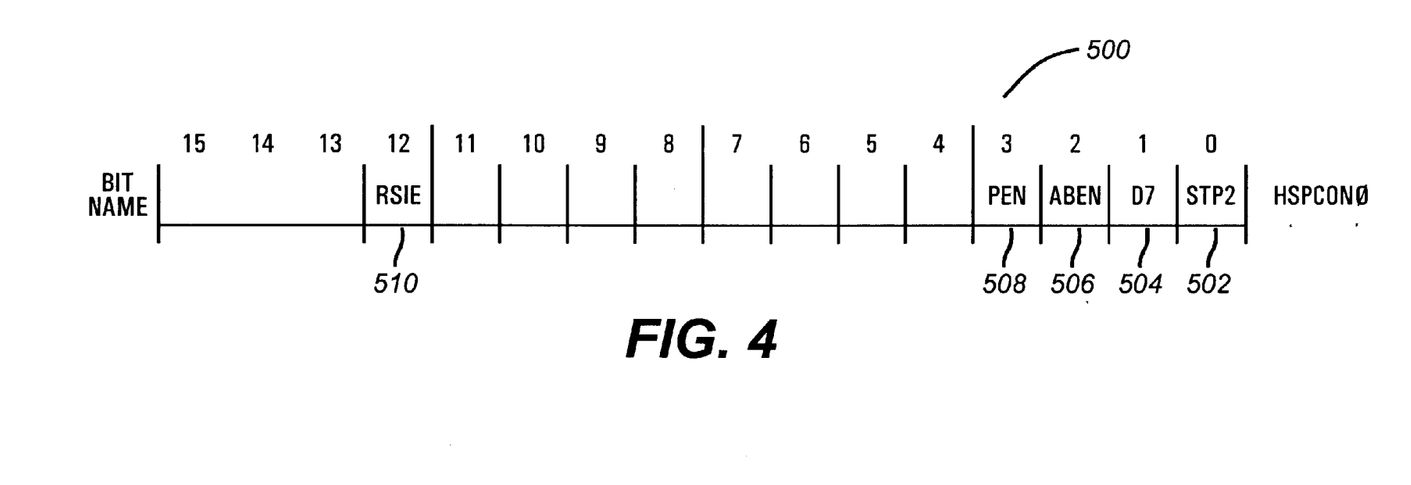
FIG. 4 is a block diagram illustrating the register contents in the asynchronous serial port according to the invention.
Figure 5:
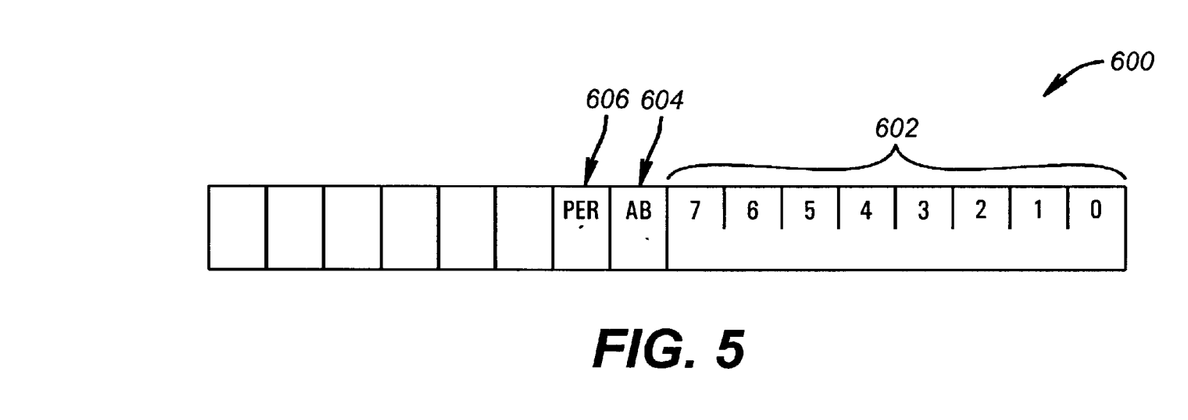
FIG. 5 is receive state machine for receiving n or n−1 data bits and an address bit.

Turning to FIG. 5, illustrated is an HPSPCON0 register 500 that implements the bit-disabling feature according to the invention when implemented in the HSUART 148. This register, in part, provides configuration settings to determine whether an address bit 306 or 326 will be employed (indicated by an address bit enable bit ABEN 506), whether a parity bit 308 or 328 will be used (indicated by a parity enable bit PEN 508), whether seven or eight bit data will be used (indicated by an enable bit D7 504), and whether a second stop bit will be used (indicated by a second stop bit enable bit STP2 502).

All these bits 502–508 affect the length of a transmit frame. Historically, hardware implementations of address bits required the address bit to always be the "ninth" data bit regardless of whether the eighth data bit was needed. The previous solution then for seven bit data transmissions required the hardware receiver to ignore the value of bit seven. The result was a total of eleven bits being transmitted but only ten bits were actually needed.

According to the invention, however, the additional control bit D7 504 is provided to trigger TX_SHIFT_SM 400 to skip at least one bit. Thus, when only seven bits of actual data are required, a system according to the present invention allows the ASP to transmit frames consisting of a start bit, data bits zero through six, an address bit and a stop bit, when control bits ABEN 506 and D7 504 are enabled. This increases the throughput for systems in which bit seven is either not used or would always be a constant.

Turning now to FIG. 5, shown is the receiver state machine RX_SM state machine 700. Control moves from the state str_disabled 702 when receive mode is entered. The receiver logic begins at state STR_SBD 704 by detecting a start bit on the receive signal. Once the start bit detection logic finds a start bit, the n_start signal is asserted and control proceeds to state str_start 706. In state str_start 706, the detection logic checks the receiver line again near the mid-point of the bit time to determine whether a valid start bit has occurred. If no start bit is detected, control returns to state str_sbd 704 where the process repeats itself. Alternatively, where a start bit is found, control proceeds to the state str_rxing 708, where the receiver begins receiving data bits. In this state, the receiver uses normal bit receive logic to sample the receive signal. A receive enable signal is asserted when a bit has been detected and is ready to shift into the shift register. An internal counter keeps track of the number of bits received. Control remains in the str_rxing state 708 until reception is complete. Reception of the frame is complete when the number of received bit matches the number of expected bits as specified by the ASP. This number is determined based on the state of the D7 signal 504, the ABEN signal 506, and the other status signals. Therefore, with D7 504, ABEN 506 and PEN 508 enabled, control will remain in state str_rxing 708 until bits zero through seven, the address bit, the parity bit, and a stop bit have been received. In this case, control returns back to state str_sbd 704 when a stop bit is the last bit received. Alternatively, where the last bit received is not a stop bit, control proceeds to state str_brk 710 where checking is done for a break condition. Control then returns back to state str_brd 704 along with the appropriate framing error signal.

Figure 6:
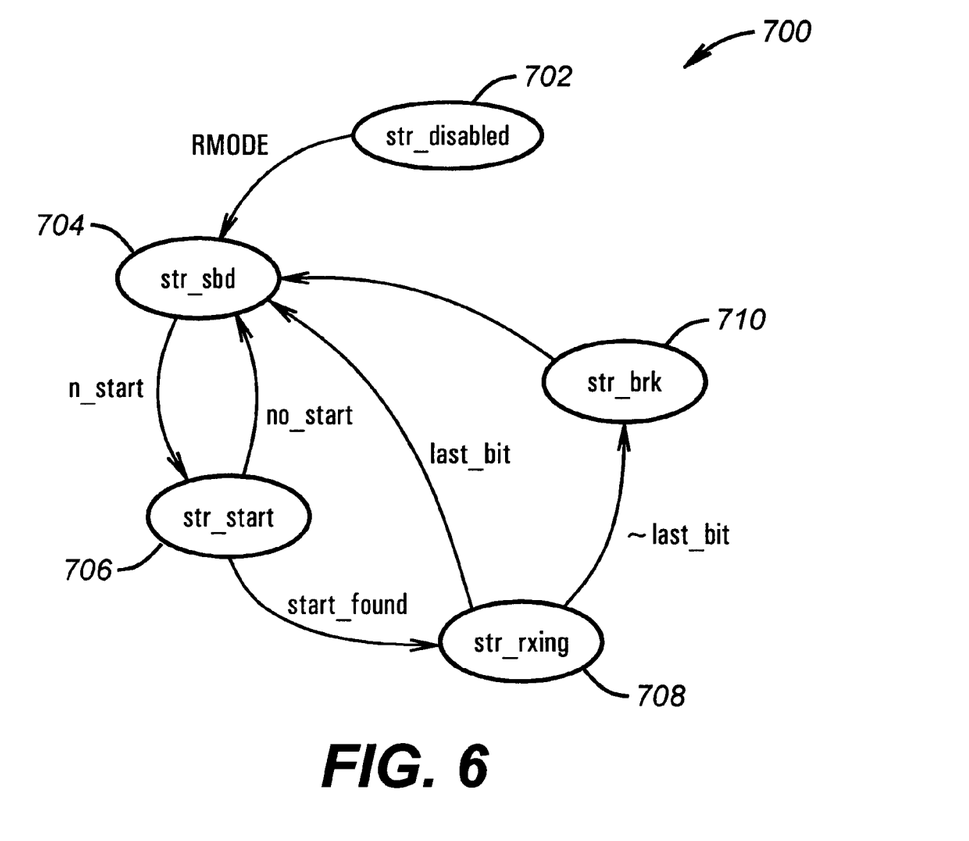
FIGS. 6A–6C are block diagrams illustrating the register contents for registers associated with the receive mode.
Figure 7A:
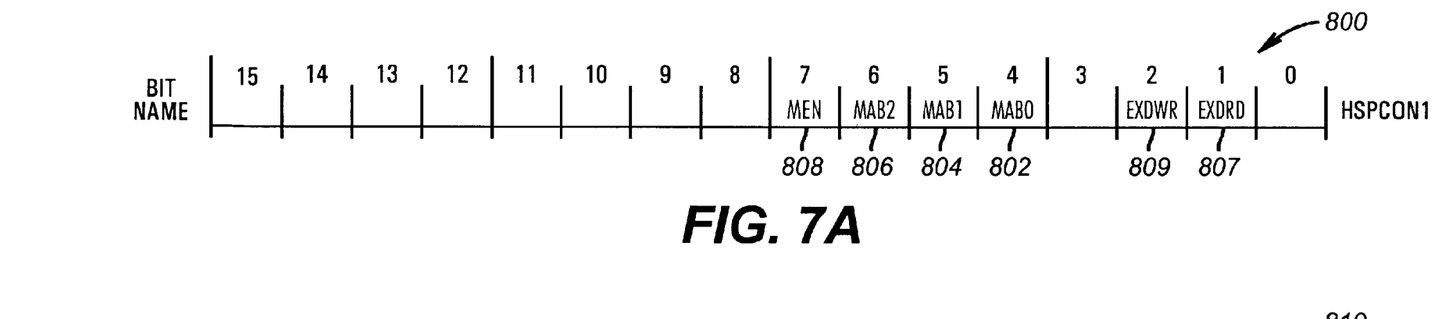
Figure 7B:
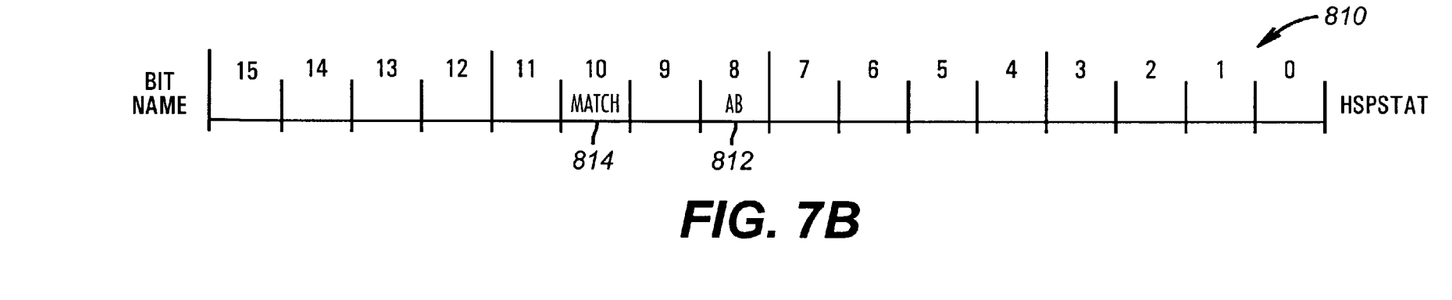
Figure 7C:
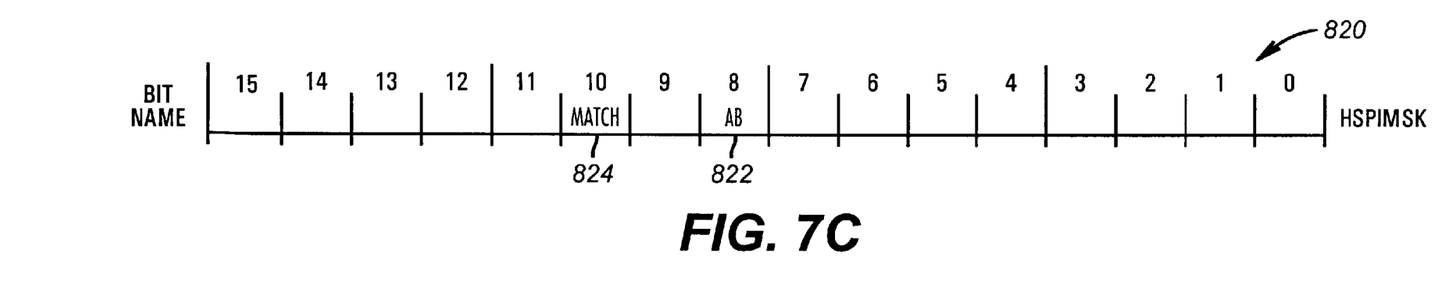

Turning now to FIGS. 6A–C, shown are registers associated with the receive mode. At this point, it is important to understand that the address bit, according to an embodiment of the present invention, is a distinct from the data bits. As described above, the system hardware responds differently to the address bit than to the data bits. The address bit functions independent of the data bits and other status bits, including enabling of character matching as well as enabling interrupt requests. According to an embodiment of the invention, shown in FIG. 6A, match bits are provided in the HSPCON1 register 800. Specifically, this register 800 includes a match enable bit MEN 808 which when true enables the characterizing matching. Further, three match address bits MAB2 806, MAB1 804, and MAB0 802 function as an address bit matching bit for a match register when the address bit is enabled by the ABEN bit 506 of the control register HSPCON0 500. A more detailed discussion concerning address matching is contained in U.S. patent application Ser. No. 09/088,610, entitled UART CHARACTER MATCHING USED FOR ADDRESS MATCHING ON A REGISTER-BY-REGISTER BASIS filed Jun. 1, 1998, by Melanie D. Typaldos, which is incorporated by reference.

The HSPCON1 register 800 further includes an extended write bit EXDWR 809 and an extended read bit EXDRD 807, which provide, when true, that 16 bit data will be read from a transmit register or received in the receive register. When these values are disabled, only eight bit data are stored in those registers, and the address bit 812 and the match status 814 can only be determined by reading the status register HPSTAT 810, shown in FIG. 6B. The HPSTAT register 810, among other things, includes a match bit MATCH 814 which is set true if the incoming data is a character or address match and an address bit AB 812 is set true. An interrupt mask register, HSPIMSK 820 correspondingly passes on the match bit MATCH 824 and the address AB 822 as interrupts.

Therefore, a system according to the invention provides an asynchronous serial port, which supports address bits in conjunction with either a 7- or 8-data bit protocol. Serial throughput is increased where bit seven is not needed or is always constant by disabling a data bit. In this way, only those data bits that have a value are transmitted. Further, the address bit is defined separate from the data bits, having functionality independent of the data bits. Finally, the foregoing system provides address generation and detection protocol which is not dependent on data frame length.

The foregoing disclosure and description of the invention are illustrative and explanatory thereof, and various changes in the details of the illustrated apparatus and construction and method of operation may be made without departing from the spirit of the invention.

What is claimed is:

1. A microcontroller comprising:

an execution unit for executing instructions; and an asynchronous serial port for communicating asynchronous frames having a frame length, each frame comprising at least one data bit and an address bit, wherein the asynchronous serial port is selectably configurable by the execution unit to communicate either n or n−1 data bits, for n greater than 1, prior to an address bit, the placement of the address bit being independent of frame length.

2. The microcontroller of claim 1, wherein n is equal to eight data bits.

3. The microcontroller of claim 1, wherein the asynchronous frame further contains a parity bit.

4. The microcontroller of claim 3, wherein the parity bit occurs after the address bit.

5. The microcontroller of claim 1, further having a transmitting mode wherein the data frames are transmitted according to the data bit configuration.

6. The microcontroller of claim 1, further having a receiving mode wherein data frames are received according to the data bit configuration.

7. The receiving mode of claim 6, wherein when the address bit of a received data frame is asserted, address matching is enabled.

8. The receiving mode of claim 6, wherein when the address bit of a received data frame is asserted, an interrupt is created to the execution unit.

9. The microcontroller of claim 1, wherein the transmission and reception of n or n−1 data bits is controlled by a seven data bit enable bit in a control register.

10. The microcontroller of claim 1, wherein the transmission and reception of address bits is controlled by a address bit enable bit in a control register.

11. The microcontroller of claim 1, wherein the data for transmission and the address bit for transmission comes from a data register.

12. The microcontroller of claim 1, wherein the data for transmission comes from a data register and the address bit for transmission comes from a register other than the data register.

13. The microcontroller of claim 12, wherein the address bit for transmission comes from a control register.

14. An asynchronous serial port for communicating asynchronous frames having a frame length, each frame comprising at least one data bit and an address bit, wherein the asynchronous serial port is selectably configurable by the execution unit to communicate either n or n−1 data bits, for n greater than 1, prior to an address bit the placement of the address bit being independent of frame length.

15. The asynchronous serial port of claim 14, wherein n is equal to eight data bits.

16. The asynchronous serial port of claim 14, wherein the asynchronous frame further contains a parity bit.

17. The asynchronous serial port of claim 16, wherein the parity bit occurs after the address bit.

18. The asynchronous serial port of claim 14, further having a transmitting mode wherein the data frames are transmitted according to the data bit configuration.

19. The asynchronous serial port of claim 14, further having a receiving mode wherein data frames are received according to the data bit configuration.

20. The receiving mode of claim 19, wherein when the address bit of a received data frame is asserted, address matching is enabled.

21. The receiving mode of claim 19, wherein when the address bit of a received data frame is asserted, an interrupt is created to the execution unit.

22. The asynchronous serial port of claim 14, wherein the transmission and reception of n or n−1 data bits is controlled by a seven data bit enable bit in a control register.

23. The asynchronous serial port of claim 14, wherein the transmission and reception of address bits is controlled by a address bit enable bit in a control register.

24. The asynchronous serial port of claim 14, wherein the data for transmission comes from a data register and the address bit for transmission comes from a register other than the data register.

25. The asynchronous serial port of claim 24, wherein the address bit for transmission comes from a control register.

* * * * *